Nov. 24, 1959 J. H. ANDREWS 2,913,900

CONTINUOUS RECORDING LOW VELOCITY FLOW METER AND DIRECTION INDICATOR

Filed April 14, 1954 2 Sheets-Sheet 1

INVENTOR.
JOHN H. ANDREWS

BY George Sipkin
George E. Pearson
ATTORNEYS

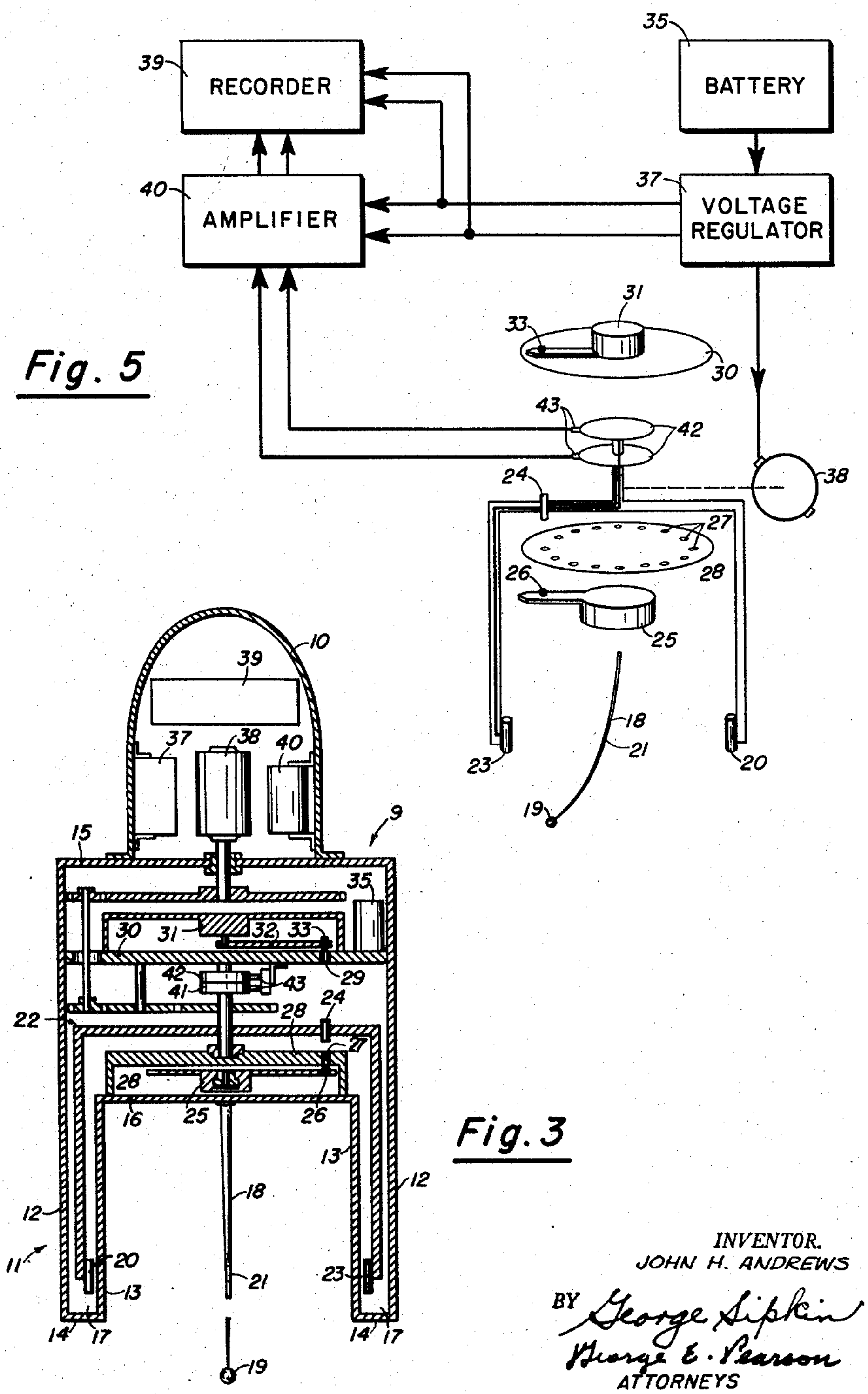
INVENTOR.
JOHN H. ANDREWS
BY George Lipkin
George E. Pearson
ATTORNEYS United States Patent Office 2,913,900

Patented Nov. 24, 1959

2,913,900

CONTINUOUS RECORDING LOW VELOCITY FLOW METER AND DIRECTION INDICATOR

John H. Andrews, La Mesa, Calif.

Application April 14, 1954, Serial No. 423,259

17 Claims. (Cl. 73—189)

(Granted under Title 35, U.S. Code (1952), sec. 266)

The invention described herein may be manufactured and used by or for the Government of the United States of America for governmental purposes without the payment of any royalties thereon or therefor.

The present invention relates to a mechanism for continuously recording the direction and flow of low velocity fluids. In one aspect it relates to the measuring of the direction and velocity of slow moving currents along the ocean floor or lake bed. In one specific aspect it relates to the measurement of the direction and velocity of fluids such as sea water by measuring the direction and the pressure of the fluid against a motion detector and transmitting such measurements onto a recording tape.

Previously used systems have not proved successful for the reason that moving parts have been exposed to water, have corroded and have been hindered in their movement by entanglement with sea weeds and other foreign matter usually found at the bottom of lake beds and ocean floors. For this reason, devices that have performed satisfactorily in swifter currents have not proved successful in slower moving currents where a high degree of accuracy is desired, Furthermore, previously known systems have become inoperative over long periods of time and frequent cleaning of moving parts has become necessary.

The difficulties of present systems have been overcome in this invention by providing a device in which there are no moving parts exposed to sea water so that frequent cleaning of the moving parts is unnecessary and that more accurate data may be obtained. A further advantage is obtained in that velocities of a lower rate may be recorded than on recording devices in present operation.

The present invention consists of a novel means for determining the velocity and direction of slow moving fluids and in one preferred embodiment of the invention, a water proof housing is provided for enclosing a rotatable scanning arm having an ionization chamber detector tube at its end. At the point of intersection of the plane of rotation of the detector tube and the axis of rotation of the rotatable scanning arm, is placed a radioactive isotope which moves in response to the direction and velocity of the fluid being measured. The detector on the rotating arm scans the radioactive field originating from the isotope and relays the signal to be recorded on recording tape. As the rotating arm passes magnetic north, a radioactive isotope on the north end of the magnetic needle impresses an additional impulse upon the first signal, causing a sharp peak in the recorded wave. From the calibrations on the tape, the direction and velocity of the fluid can then be determined.

Although the preferred embodiment is shown in the measurement of the direction and velocity of slow moving currents along the ocean floor, it should be understood that with minor variations and modifications readily apparent to one skilled in the art, the present invention may also be used in measuring the direction and velocity or strength of any force desired, such as wind currents or the strength of electrostatic charges or electromagnetic fields.

One object of this invention is to provide an improved apparatus for measuring the rate and direction of flow of slow moving fluids.

Another object is to provide improved means of measuring the direction and rate of flow of slow moving ocean currents such as are frequently found on the ocean floor.

A further object is to provide a suitable housing for containing the moving parts of a device for measuring the direction and rate of flow of slow moving fluids.

A still further object is to provide an improved device for measuring the direction and velocity of slow moving fluids in which there are no moving parts exposed to the fluid so that the effect of corrosion, marine growth and entanglement by foreign matter is minimized and more accurate and uniform measurements are obtained during the period in which the device is in use.

Other objects and many of the attendant advantages of this invention will be readily appreciated as the same becomes better understood by reference to the following detailed description when considered in connection with the accompanying drawings wherein:

Fig. 3 is a vertical cross-sectional view of the direction and velocity indicator and recording mechanism taken along the lines 3—3 of Fig. 1;

Fig. 5 is a block diagram showing the electrical connections between the various elements.

Figure 1:
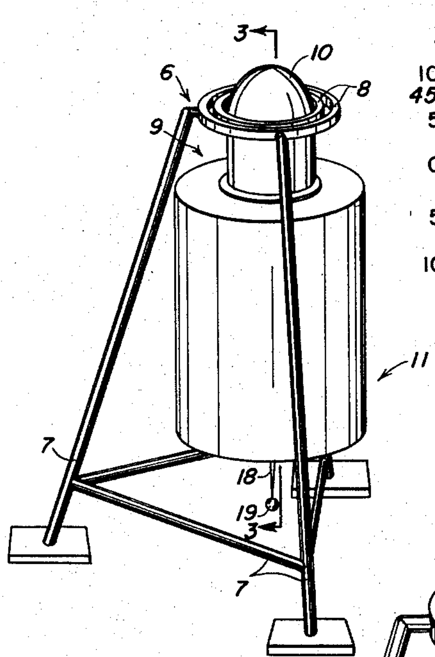
Fig. 1 is a pictorial view of one preferred embodiment of the invention showing the measuring device suspended from a tripod frame for recording current direction and velocity along the ocean floor.

Referring now to the drawings, wherein like reference characters designate like or corresponding parts throughout the several views, there is shown in Fig. 1 a supporting framework 6 for holding the indicator and recording mechanism in an upright position even when resting on bumpy or irregular ground usually found on an ocean floor or lake bed. The preferred embodiment comprises a tripod support 7 with a gimbal ring arrangement 8 at its top. Suspended from this gimble ring is a container 9 comprising a watertight dome shaped cover 10 and a watertight bell shaped case 11 suspended therebelow. The center of gravity of said container is below its attachment with the gimbal rings so that it will remain in upright position even when the tripod is resting on bumpy ground. The walls of the bell shaped case 11 comprise an outer cylindrical wall 12, inner cylindrical wall 13, lower connecting ring 14 connecting the lower edges of the inner and outer walls, upper connecting ring 15 connecting the outer wall to the dome shaped cover and plate 16 attached to all parts of the upper edge of the inner wall 13. The inner and outer walls of the bell case are spaced to permit rotation of a detector arm in a watertight passageway 17 as will be later explained.

While certain parts of the container are removably connected to permit easy access to the interior for installation and removal of recording tape and equipment, it should be understood that the container 9 is made waterproof to protect the recording and indicating equipment from exposure and corrosion.

Mounted in the center of plate 16 on the bottom side is a flexible whip 18 for holding a ball 19 used in detecting the fluid motion and a radioactive isotope 21. This isotope may be one of a number available and is limited only in that it could be of such strength and half life duration as to be practical for the use intended. This isotope may be one which will give off gamma rays, neutrons and gamma rays, X-rays or any other penetrating radiation. Of the many isotopes which are suitable for this purpose and are well known to those skilled in the art, cobalt$^{57}$ and radium$^{225}$ are exemplary of those which are both suitable and available. This whip 18 is preferably coated to repel marine growth and extends only slightly below the lower edge of the bell case 11. In this manner the whip is protected by the bell case from entanglement with weeds, debris, and other foreign matter caused by the movement of the current, yet at the same time extending the ball 19 below the case 11 to be responsive to the direction and velocity of the current.

Above plate 16 is rotatably mounted an inverted U-shaped scanning arm assembly 22 with both ends extending downwardly into the passageway 17 between the outer and inner walls 12 and 13. At one end is secured an ionization chamber detector tube 23. A pre-amplifier, not shown, may also be mounted on the arm if desired and a counterweight 20 is placed on the other end for dynamic balance. On the horizontal portion of the scanning arm is mounted a second ionization chamber detector tube 24 used in transmitting a second signal when that portion of the arm passes magnetic north as will be hereinafter explained.

Centrally mounted on plate 16 and below the horizontal portion of the scanning arm is a magnetic compass 25 with a radioactive isotope 26 mounted on the end of the compass needle. Between the compass 25 and the horizontal portion of the scanning arm 22 is mounted a lead shield 28 with perforations 27 therethrough and spaced about 1° apart. All perforations 27 are equally spaced from the vertical axis of rotation of the compass needle and in vertical alignment with the radioactive isotope on the compass needle as the needle swings underneath. The lead shield 28 absorbs radiation from isotope 26 except for the rays which project through the perforation 27 in direct vertical alignment therewith. This arrangement permits greater accuracy in indicating magnetic north on the recording tape as will be further explained.

Figure 4:
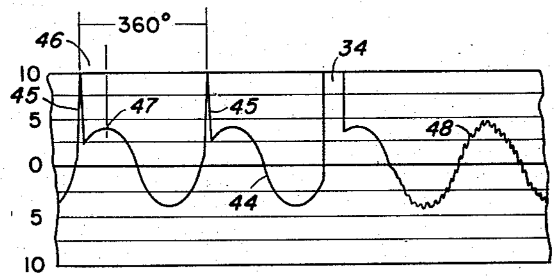
Fig. 4 is a sample of data as recorded on the recording tape.
Figure 2:
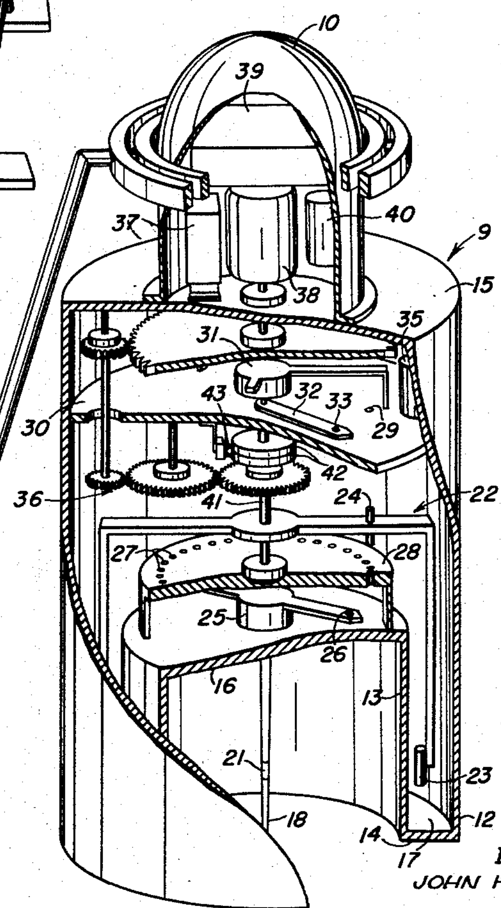
Fig. 2 is an enlarged pictorial view with a portion of the water tight casing broken away to show the interior working mechanism.

Mounted within case 11 above scanning arm 22 is a second lead shield 30 having one perforation 29 preferably in vertical alignment with one of the perforations 27 of the first shield 28. Ionization chamber detector tube 24 comes into vertical alignment with perforation 29 once during each revolution of the scanning arm 22. Mounted on top of shield 30 is a long running spring clock 31 having a horizontally moving clock hand 32 with a radioactive isotope 33 on the end. Isotope 33 is so positioned as to pass over perforation 29 once during each revolution of the clock hand 32. Clock hand 32 moves at a much slower speed than the scanning arm and may be set to revolve once per minute, hour, day, or other desired period of time. When isotope 33 is in vertical alignment with perforation 29 and the detector tube 24 passes directly beneath the perforation 29, a periodic time reference impulse is recorded on the tape as shown by 34 on the recording tape in Fig. 4.

Mounted in the top portion of case 11, above the second shield 30 and around the supports for clock 31 is mounted a power supply pack shown as batteries 35. A gear drive mechanism 36 is also suitably mounted to transmit the rotation of an electric motor drive gear to the scanning arm assembly 22. Suitably mounted in the dome shaped cover 10 is the amplifier 40, voltage regulator 37, electric motor 38 and roll paper recording mechanism 39.

Suitable electrical connections are made from the power supply 35 through the voltage regulator 37 to the electric motor 38. Other electrical connections send impulses from detector tubes 23 and 24, through slip rings 42 mounted on the scanning arm assembly shaft 41, where brushes 43 transmit the impulses through the amplifier 40 to actuate the stylus of the recording mechanism 39.

*Operation*

The operation of this instrument is as follows: First, the entire unit is calibrated by placing it in a flow of fluid having known rates of flow. Then the entire unit is placed on the ocean bottom or other place where the rate and direction of flow is to be measured. The flow of the fluid around the unit will deflect the ball at the bottom of the unit and in so doing will move the radioactive charge in the whip closer to one side of the open portion at the bottom of the case. This will cause a sine wave type of record 44 to be made on the recording tape, the amplitude of which will be a function of the rate of flow and the period will be the time of rotation of the scanning detector arm. Short pulse, high amplitude deflections 45 will occur every period (or cycle) on the recording tape when the scanning arm passes magnetic north as a result of the magnetic compass arrangement. The distance 46 between this deflection 45 and the peak 47 of the sine wave represents the direction of flow of the fluid measured. Occasional, longer pulse deflections 34 occurring many cycles apart will result from the clock timing arrangement and will orient the record according to time. After completing its record on the ocean bottom the unit must again be calibrated to make corrections for marine growth on the unit, loss of battery power, and decrease in radioactivity. The corrections are then applied to the recording.

The principal function of this system is to provide means for recording low velocity rates and direction of flow with a unit having no moving parts exposed to the measured flow. When the unit is used in fluids having a higher rate of flow, oscillations of the ball will occur causing sharp vertical deflections as shown by 48 on the tape in Fig. 4. When this occurs, a heavier ball and a less flexible whip should be used.

Obviously many other modifications and variations of the present invention are possible in the light of the above teachings. It is therefore to be understood that within the scope of the appended claims the invention may be practiced otherwise than as specifically described.

What is claimed is:

1. Apparatus of the type described comprising a watertight enclosure in combination with means omnidirectionally responsive to the direction and magnitude of a force excitable in any direction in a plane, including a flexible whip secured at one end to said enclosure and an object fastened to its free end and suspended in the path of action of said force, a radioactive element fixed to said whip between the object and said enclosure and means for detecting the response of said element to said force, said responsive means being movable in accordance with the direction and magnitude of said force and said detecting means detecting the direction and distance of movement of said responsive means resulting from the force.

2. Apparatus for measuring force comprising a hollow bell shaped housing in combination with means responsive to a force excitable in any direction in a plane, and means for detecting the response of said means to said force, said responsive means including a radioactive field whose center is movable in any direction substantially parallel with said plane from a neutral position in response to the force being measured, said detecting means comprising an element rotatively mounted within said hollow bell shaped housing adjacent said plane of travel of the radioactive field means for detecting the increase or decrease in strength of the radioactive field at at least one point spaced from said neutral position as the center of the field moves in response to the direction and magnitude of the force being measured.

3. Apparatus for measuring force comprising a hollow bell shaped housing in combination with means responsive to the direction and magnitude of a force excitable in any direction in a plane and means for detecting the response of said means to said force, said responsive means including a radioactive field whose center is movable omnidirectionally in said plane from a neutral position in response to the force being measured, said detecting means comprising an element rotatively mounted within said hollow bell shaped housing and normally driven in a circular path around the plane of travel of the radioactive field means for detecting the increase or decrease in strength of the radioactive field at predetermined points spaced from said neutral position as the center of the field moves in response to the force being measured, the direction of the increase in strength of said field indicating the direction of said force.

4. Apparatus of the type described comprising a hollow bell-shaped housing in combination with means responsive to a force to be measured, and means for detecting the response of said means to said force, said responsive means comprising a flexible whip supported at one end by said housing, an object offering resistance to the force being measured, said object being attached to the whip at the free end thereof, and means attached to the whip at a point thereon between the free end and the point supported by the housing creating a radioactive field around said whip and moving with the whip from a neutral position in response to the force being measured, said detecting means comprising means rotatively mounted within said hollow bell shaped housing and normally driven in a circular path around the plane of travel of the radioactive field means for scanning said field to detect the increase or decrease in strength of the radioactive field at points spaced from said neutral position as the center of the field moves in response to the force being measured.

5. Apparatus of the type described comprising in combination means responsive to a force to be measured, and means for detecting the response of said means to said force, said responsive means including means for producing an omni-directional radioactive field whose center is movable from a neutral position in response to the force being measured, said detecting means comprising a rotating scanning arm assembly, a radioactive detection device mounted on the arm assembly for rotation about said neutral position said radioactive detection device indicating the change in strength of the radioactive field at points equidistant from said neutral position and circumferentially spaced thereabout as the center of the field moves in response to the force being measured.

6. Apparatus of the type described comprising a hollow bell shaped housing in combination with means responsive to an omni-directional force to be measured, means for detecting the response of said means to said force, and means indicating the response to said force, said responsive means including means for producing a radioactive field whose center is movable from a neutral position in response to the force being measured, said detecting means comprising means mounted for rotation within said housing about said neutral position for detecting the increase or decrease in strength of the radioactive field at circumferentially spaced points equidistant from said neutral position as the center of the field moves in response to the force being measured, said indicating means indicating both direction and magnitude of the force to be measured.

7. Apparatus of the type described comprising in combination a cylindrical housing a rotating scanning arm centrally mounted within the housing, means attached to the bottom of said housing including means for producing a radioactive field and movable in direction and distance in accordance with the direction and magnitude of the force to be measured, and detecting means on said scanning arm for detecting the movement of the means responsive to said force.

8. Apparatus of the type described comprising in combination a cylindrical housing, an annular housing portion on the end of the cylindrical housing, a rotating scanning arm centrally mounted within the housing, the ends of said arm extending downwardly into said annular portion, means attached to the bottom of said housing responsive to the direction and magnitude of the force to be measured comprising a yielding whip with a force resistant object mounted thereon and an object transmitting radiant energy attached to said whip, and detecting means on said scanning arm for detecting the movement of the source of radiant energy responsive to said force, and means responsive to said detecting means for indicating the direction and magnitude of said movement.

9. Apparatus of the type described comprising in combination a cylindrical housing, a rotating scanning arm centrally mounted within said housing, a flexible whip attached to the bottom of said housing and movable in response to the direction and magnitude of the force to be measured, a force resistant object mounted thereon, an object transmitting radiant energy attached to said whip and movable therewith, a radiant energy detection device mounted on an end of said scanning arm for detecting said energy, a magnetic compass centrally mounted within the housing and having a radiant energy source mounted on the end of the needle thereof, a second radiant energy detection device mounted on said scanning arm for detecting the radiant energy from the needle of said magnetic compass, and means responsive to said detection devices for indicating the energy detected thereby during the scan of said devices.

10. Apparatus of the type described comprising in combination a cylindrical housing, an annular housing portion on the end of the cylindrical housing, a rotating scanning arm centrally mounted within the housing, the ends of the arm extending downwardly into the annular portion and adapted for rotation therein, means attached to the bottom of said housing responsive to the direction and magnitude of the force to be measured comprising a yielding whip extending below the annular portion with a force resistant object attached to the end thereof and a radiant energy transmitting object attached to said whip in the plane of rotation of the end of said scanning arm, a radiant energy detection device mounted on the end of said scanning arm for detecting the variation in radiant energy received from said whip as it moves responsive to said force, a magnetic compass centrally mounted within the housing and having a radiant energy source mounted on the end of the needle thereof, a second radiant energy detection device mounted on said scanning arm for detecting the radiant energy from the needle of said magnetic compass, and means responsive to said detection devices for indicating the energy detected by said devices at plural points on the scan thereof.

11. Apparatus of the type described comprising in combination a cylindrical housing, a rotating scanning arm centrally mounted within said housing and having a first radiant energy detecting device attached to the end thereof, means attached to the bottom of said housing whose movement is responsive to the direction and magnitude of the force being measured and having a source of radiant energy mounted thereon, said detecting device transmitting a signal proportional to its distance from said source of radiant energy, a clock motor with a clock arm adapted to rotate at a predetermined speed, a radiant energy source on the end of said clock arm, a second radiant energy detecting device on said scanning arm, shielding means between the radiant energy source on the clock arm and said second radiant energy detecting device on said scanning arm, there being a perforation in said shielding means to permit said second energy detecting device to receive energy from said clock arm at least once for each cycle of rotation of said clock arm, said second detecting device transmitting a signal in response to the absorption of energy from said clock arm to indicate time intervals during the operation of said apparatus, and means responsive to said signals for producing a time correlated indication thereof.

12. Apparatus of the type described comprising in combination a cylindrical housing, a rotating scanning arm centrally mounted within said housing and having a first radiant energy detecting device attached to the end thereof, means attached to the bottom of said housing whose movement is responsive to the direction and magnitude of the force being measured and having a source of radiant energy mounted thereon, said first detecting device transmitting a signal proportional to its distance from said source of radiant energy, a clock motor with a clock arm adapted to rotate at a predetermined speed, a radiant energy source on the end of said clock arm, a second radiant energy detecting device on said scanning arm, shielding means between the radiant energy source on the clock arm and said second radiant energy detecting device on said scanning arm, there being a perforation in said shielding means to permit said energy detecting device to receive energy from said clock arm at least once for each cycle of rotation of said clock arm, said second detecting device transmitting a signal in response to the absorption of energy from said clock arm to indicate time intervals during the operation of said apparatus, and direction indicating means comprising a magnetic compass centrally mounted and having a source of radiant energy mounted on the end of the needle thereof, said second energy detecting device receiving and transmitting a signal when said scanning arm passes magnetic north during each rotation thereof, and means responsive to said signals for producing a time correlated indication thereof.

13. Apparatus of the type described for measuring the velocity and direction of slow moving fluids comprising in combination a water tight container comprising an upper dome shaped cover and a lower case, said lower case comprising an outer cylindrical wall, an inner cylindrical wall spaced from said outer wall, a lower connecting ring connecting the lower edge of the outer wall with the lower edge of the inner wall, said inner wall being covered at the top, a scanning arm assembly rotatably mounted above said cover, the end portions of the arm extending downwardly between the inner and outer walls of said case and adapted to be revolved therethrough, a detector tube mounted on said arm, a flexible whip centrally mounted on the underside of said inner wall cover and extending below the walls, a ball mounted on said whip and a radioactive isotope mounted intermediate the ends of said whip substantially within the plane of rotation of said tube, a perforated lead shield mounted below the horizontal portion of said scanning arm assembly, there being perforations on said shield spaced uniformly apart and substantially equidistant from the vertical axis of rotation of said scanning arm, a magnetic compass needle rotatably mounted below the lead shield and having a radioactive isotope mounted on the point thereof and in vertical alignment with said perforations as the needle swings toward magnetic north, a second detector tube mounted on the horizontal portion of the scanning arm and adapted to rotate in vertical alignment over said perforations, a second lead shield mounted above the scanning arm and having one perforation in vertical alignment with one of the perforations of said first lead shield, a clock mechanism mounted above said second lead shield, a horizontally rotating clock hand with a radioactive isotope positioned on said clock hand so as to pass over the perforation in the second lead shield, batteries mounted in proximity to said second lead shield, an electric motor mounted in the dome cover, gearing means connecting the motor to the scanning arm for rotation thereof, a voltage regulator, recording mechanism and amplifier mounted in said dome cover, and suitable electrical connections connecting the batteries, voltage regulator, motor, detector tubes, amplifier and recording mechanism.

14. Apparatus of the type described for measuring the velocity and direction of slow moving fluids comprising in combination a water tight container comprising an upper dome shaped cover and a lower case, said lower case comprising an outer cylindrical wall, an inner cylindrical wall spaced from said outer wall, a lower connecting ring connecting the lower edge of the outer wall with the lower edge of the inner wall, said inner wall being of less height than the outer wall and being covered at the top, an inverted U-shaped scanning arm assembly rotatably mounted above said cover, the end portions of the arm extending downwardly between the inner and outer walls of said case and adapted to be revolved therethrough, a detector tube mounted on one end of said end portions and a counter balance mounted on the other, a flexible whip centrally mounted on the underside of said inner wall cover and extending below the connecting ring connecting the inner and outer walls, a ball mounted on the end of said whip and a radioactive isotope mounted intermediate the ends of said whip and in the plane of rotation of the detector tube on the end of said scanning arm, a perforated lead shield mounted on said inner wall cover and below the horizontal portion of said scanning arm assembly, there being perforations on said shield spaced 1° apart and equidistant from the vertical axis of rotation of said scanning arm, a magnetic compass needle rotatably mounted below the lead shield and having a radioactive isotope mounted on the point thereof and spaced from said axis of rotation so as to be in vertical alignment with said perforations so as the needle swings toward magnetic north, a second detector tube mounted on the horizontal portion of the scanning arm the same distance from the axis of rotation of said scanning arm as the perforations on said lead shield and adapted to rotate in vertical alignment over said perforations, a second lead shield mounted above the scanning arm and having one perforation in vertical alignment with one of the perforations of said first lead shield, a long running spring clock mechanism mounted above said second lead shield, a horizontally rotating clock hand with a radioactive isotope positioned on said clock hand so as to pass over the perforation in the second lead shield, batteries mounted in proximity to said second lead shield, an electric motor mounted in the dome cover, gearing means connecting the motor to the scanning arm for rotation thereof, a voltage regulator, recording mechanism and amplifier and tape recording mechanism mounted in said dome cover, and suitable electrical connections connecting the batteries, voltage regulator, motor, detector tubes, amplifier and recording mechanism.

15. In a device of the class described, source means for producing an omni-directional energy field propagated in directions substantially perpendicular to a predetermined direction, means mounting said source means intermediate the ends of said means for movement from a neutral position in all of said propagated directions, means for cyclically detecting and indicating the omni-directional field strength pattern of said field, directional reference means for producing a reference energy field independent of said source means at an angular coordinate of said field pattern, and means synchronized with said detecting and indicating means and responsive to said reference field for providing said indicating pattern with a reference mark indicative of said angular coordinate.

16. Apparatus for measuring the magnitude and direction of a force exertable in any direction in a predetermined plane comprising movable source means for producing a field of energy propagated therefrom omni-directionally normal to a line which is normal to said plane, means responsive to the force to be measured mounting said source means intermediate the ends of said means for moving said source means from a predetermined position in accordance with the magnitude and direction of said force, and means for detecting and indicating the omni-directional field strength pattern of said energy with respect to said predetermined position, said last mentioned means including means for producing a reference energy field independent of said source means for indicating the orientation of said indicated pattern with respect to one direction in said plane.

17. Apparatus of the type described comprising in combination a cylindrical housing, a rotating scanning arm centrally mounted within said housing, force responsive means including a radiant energy transmitting element attached to the bottom of said housing responsive to the direction and magnitude of the force to be measured, a radiant energy detecting device on said scanning arm substantially in the horizontal plane of said radiant energy transmitting element and timing means for indicating the time intervals the device is in use, said timing means comprising a clock motor having an arm adapted to rotate at a predetermined speed, a radiant energy source on the end of said clock arm, a second radiant energy detection device mounted on said scanning arm, a radiant energy absorbing shield between said clock arm and said second radiant energy detection device, said shield having a perforation to permit radiation detection from said clock arm by said second detection device when said clock arm, said perforation and said second detection device are in vertical alignment, and means responsive to said detection devices for indicating the energy received from the force responsive means and said clock arm.

References Cited in the file of this patent

UNITED STATES PATENTS

| | | |
|---|---|---|
| 2,393,638 | Keinath et al. | Jan. 29, 1946 |
| 2,399,061 | Rosenbloom | Apr. 23, 1946 |
| 2,462,577 | Warren | Feb. 22, 1949 |
| 2,543,020 | Hess | Feb. 27, 1951 |
| 2,554,715 | Mellett | May 29, 1951 |
| 2,599,975 | Carpenter | June 10, 1952 |
| 2,611,268 | Mellen | Sept. 23, 1952 |
| 2,665,583 | Anjanos | Jan. 12, 1954 |
| 2,683,813 | Friedman | July 13, 1954 |